Nov. 21, 1939.                    D. R. HILLIS                    2,180,632
                       REVERSIBLE SINGLE-LINE FEEDER
                           Filed Oct. 15, 1936
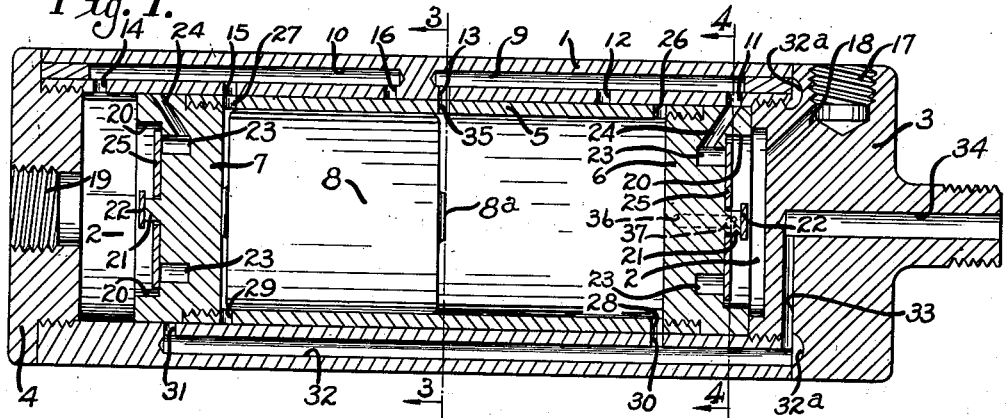
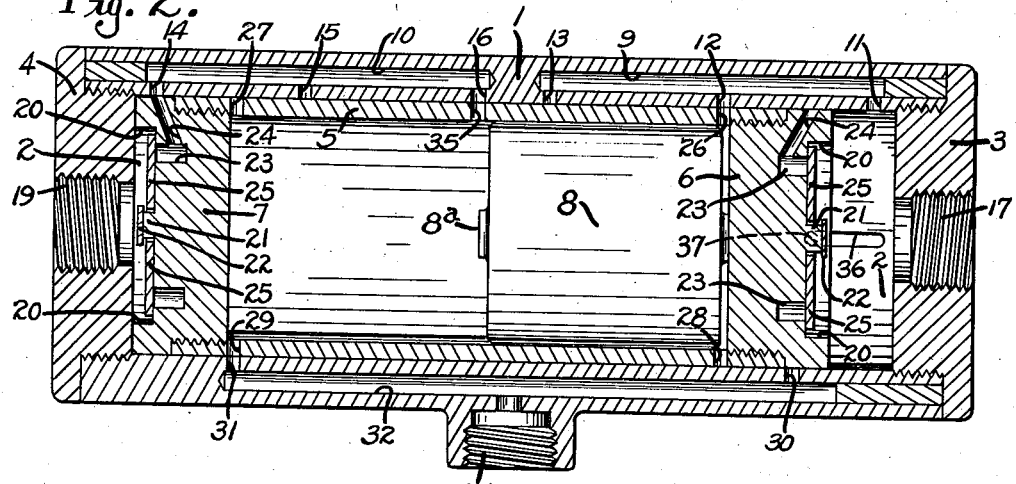
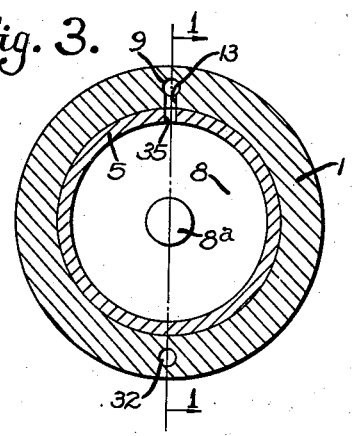
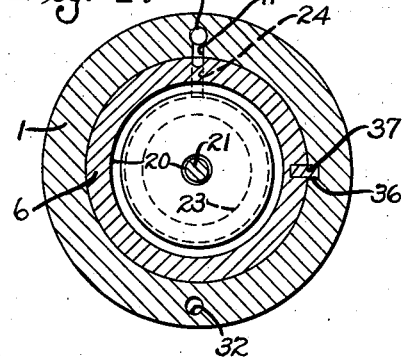
INVENTOR
David R. Hillis
BY Ralph K. Evans
ATTORNEY Patented Nov. 21, 1939

2,180,632

UNITED STATES PATENT OFFICE 2,180,632

REVERSIBLE SINGLE-LINE FEEDER

David R. Hillis, Detroit, Mich., assignor to Trabon Engineering Corporation, Cleveland, Ohio, a corporation of Ohio Application October 15, 1936, Serial No. 105,781

3 Claims. (Cl. 184—7)

The present invention relates to feeders for a reversible fluid distributing system of the single pipe-line type wherein fluid passes through the feeder, discharging a measured quantity thereof out of an outlet port and then by-passes to the continuation of the pipe-line after which flow of the fluid is stopped and is then passed through the pipe-line and feeder in the reverse direction. It is particularly adapted for lubricating purposes in such a fluid distributing system.

In my Patent No. 1,997,406, issued April 9, 1935, I disclosed three species of feeders for use in such a distributing system. In my copending application, Serial No. 738,656, filed August 6, 1934, I disclosed a system using another species of such a feeder and I have since filed a divisional application on the feeder therein disclosed, being application, Serial No. 78,784, filed May 9, 1936.

In all of my said former disclosed devices, I utilized the principle of a piston reciprocating in a fixed cylinder which had suitable connecting passages and control valves in order to make it operative. These all utilize three cylindrical bores which must be very accurate in order to accommodate the piston valves as well as the main piston.

An object of the present invention, is therefore, the provision of a feeder that will eliminate some of the difficult boring operations, as I may now utilize common tubing for a sleeve out of which to make a sliding piston in which another piston reciprocates.

Another object of my present invention is the provision of a feeder of the class described which will operate effectively with but few moving parts.

A further object of my invention is to provide a fluid feeder of the above type comprising a check valve on each end of a piston for closing a by-pass port until the piston has been moved sufficiently by the flow to disconnect its ports whereby the feeder has positive operating characteristics on high or low pressure and in any mounted position.

It is also an object of my invention to provide a feeder that comprises a piston reciprocating within a hollow piston for discharging a quantity of fluid therefrom and for thereafter opening a by-pass connection therethrough.

The invention itself, however, both as to its construction and its method of operation, together with additional objects and advantages thereof, will best be understood from the following description of specific embodiments, when read in conjunction with the accompanying drawing, in which:

Fig. 1 is a sectional view of one embodiment of my improved feeder taken on the line 1—1 of Fig. 3;

Fig. 2 is a sectional view of a slightly modified form of the feeder shown in Fig. 1 having substantially the same operative parts as that shown in Fig. 1; said parts being shown in the reverse position to that shown in Fig. 1;

Fig. 3 is a sectional view of the feeder taken on line 3—3 of Fig. 1; and

Fig. 4 is a sectional view of the feeder taken on the line 4—4 of Fig. 1.

Reference to these views in which like characters are employed to designate like parts throughout will now be made. The feeder shown in Figs. 1, 3 and 4 is substantially the same as that shown in Fig. 2 save for the location of the outlet ports and one of the dual-service ports. By the term dual-service port, I mean a port that acts in two capacities alternately, first as an inlet port and then upon reversal of flow in the pipe line, it acts as an outlet port, and conveys fluid passing through the feeder to the continuation of the pipe line or circuit.

The feeder shown in Figs. 1 to 4 inclusive comprises a body portion 1 which may be of any exterior shape, but which is preferably cylindrical as shown. The body is bored to provide a cylindrical piston guiding orifice 2, the end walls of which are closed by plugs 3 and 4 having suitable means for securing them to the body 1 such as the screw thread engagement shown.

Dividing the closed piston guiding orifice 2 in two end compartments is a hollow cylindrical piston 5 slidably disposed therein and comprising a sleeve member closed at each end by end fixtures or plugs 6 and 7. Mounted to reciprocate in the hollow piston 5 is an auxiliary piston 8, which has end spacing stops 8a and which divides the hollow piston 5 into two opposed chambers.

The body 1 is provided with two passages 9 and 10, each passage being substantially parallel to the piston guiding orifice 2 and being of a length sufficient to reach from one end of the body 2 to a portion adjacent the center thereof. The passage 9 has three ducts 11, 12 and 13 connecting it with the orifice 2. The passage 10 has three similar ducts 14, 15 and 16 connecting it to the orifice 2.

In Fig. 1, the plug 3 is provided with a dual-service port 17 shown on top but which may be in any portion of the plug. When located on the top as shown, or on the side, it connects through duct 18 with the interior of cylinder 2 at one end thereof. The inner face of said plug 3 is shown as provided with a circular recess but this is not essential. As shown in Fig. 2, the plug 3 is provided with a dual-service port 17 passing directly through it so that it communicates directly with cylinder 2, and similarly plug 4, in both modifications shown in Fig. 1 and Fig. 2, is provided with a dual-service port 19 passing directly therethrough and communicating directly with cylinder 2. All said dual-service ports are provided with suitable means for connection to a pipe line, as for instance, by means of the screw threaded portions shown.

Each of the plugs 6 and 7 which close the respective ends of the hollow piston 5 are cut away on their outer sides to provide a circular groove 20 surrounding a central stud portion 21 on which is mounted a valve stop member 22.

A smaller groove or circular valve recess 23 is also cut in each of said plug members 6 and 7 from the inner portion of each groove 20 of said plug in such manner as to provide a shoulder on each side of said passage and a duct 24 leads from the inner portion of each of said passages 23 to the circumferential wall of cylinder 2. A centrally pierced disc valve 25 is mounted to slide on each stud 21 in each groove 20 in such manner as to close the passage 23 to the flow of fluid from cylinder 2 but to permit the flow of fluid from duct 24 into cylinder 2.

The cylindrical piston 5 is provided with two inlet ports 26 and 27, at its respective ends. Port 26 is adapted to be alternately closed to and then to register with port 12 and port 27 is adapted to alternately register with and then to be closed to port 15.

The cylindrical piston 5 is also provided with two discharge ports 28 and 29 at its respective ends. Port 28 is adapted to register with a port 30 in walls of orifice 2 when cylindrical piston 5 is moved to the right, as shown in Fig. 1, and to be out of registry therewith when moved to the left, as shown in Fig. 2. Port 29 is adapted to register with a port 31 in cylinder 2 when the cylindrical piston 5 is moved to the left, as shown in Fig. 2, and to be out of registry therewith when moved to the right, as shown in Fig. 1.

A connecting discharge passage 32 is provided in the wall of the body of the feeder, and this passage may connect through a circular channel 32a cut in the inner surface of the plug 3 to a passage 33 bored in the plug 3, leading to a discharge outlet port 34, provided on the end of the plug, as shown in Fig. 1. Or, as shown in Fig. 2, the passage 32 may have an outlet port 34 directly connected thereto, and threaded for connection to a bearing or pipe line.

The cylindrical piston 5 is also provided with a by-pass outlet port 35 which is controlled by the auxiliary piston 8 to alternately register with the ports 13 and 16. The side of the piston guiding orifice 2 is provided with an elongated slot or keyway 36 and the plug 6 in the cylindrical piston 5 is provided with a pin 37 which projects into the axially disposed slot 36 to prevent the cylindrical piston 5 from turning axially relative to the orifice 2. This provides the interconnection of piston ports and the orifice ports, as the piston 5 slides in the orifice 2.

In Fig. 1, the parts are shown in the positions that they would occupy when fluid has entered the feeder from the left through dual-service port 19 and after shifting cylindrical piston 5 to the right preparatory to passing into cylindrical piston 5 to actuate piston 8, and in Fig. 2 the parts are shown in the opposite position.

Let us therefore assume that the embodiment shown in Fig. 1 is hooked up in a pipe-line circuit and that fluid is flowing therethrough in a direction so as to pass into the feeder through its dual-service port 19 and to pass out of its dual-service port 17, after discharging its measured quantity of fluid out of the discharge port 34.

As the fluid flowing under pressure passes through dual-service port 19 into the adjacent compartment in guiding orifice 2, it causes cylindrical piston 5 to shift to the position shown in Fig. 1, since it pushes disc valve 25 against innermost portion of recess 20 in plug 7, so as to block circumferential groove 23. It then passes through duct 14 into passage 10 from whence it can not pass anywhere until cylindrical piston 5 has shifted to the position shown in Fig. 1.

Thereafter the fluid passes out of passage 10 through ducts 15 and 27, which are then adapted to register, passing into cylindrical piston 5 to the left of piston 8. Piston 8 is provided with the space stop member 8a leaving a large area therearound for fluid pressure to be built up between the plug 7 and the piston 8 so as to cause the latter to move to the right. Before piston 8 closes duct 35, a trivial quantity of fluid will pass out of ducts 35 and 13 into passage 9, thence through duct 11, passages 24 and 23 into cylinder 2 and thence to the pipe line through duct 18 and dual-service port 17.

The remainder of the fluid on the right of piston 8 is then discharged to the bearing or other receptacle, by passing out of ducts 28 and 30 into discharge passage 32 which leads to passage 33 and outlet port 34.

After the piston 8 has shifted to the right from the position shown in Fig. 1, fluid continuing to enter cylindrical passage 5 through duct 27 is then permitted to pass through the feeder by means of by-pass ducts 35, 13, passage 9, duct 11, passages 24 and 23, causing disc valve 25 to move to the right against the stop member 22 permitting the fluid to pass directly into the recessed portion 20 of plug 6 which recessed portion registers with the other compartment in guiding orifice 2, from whence it may pass through duct 18 to dual-service port 17.

In the modification shown in Fig. 2, the action is exactly the same, save that in lieu of the duct 18 the dual-service port 17 communicates directly with the adjacent compartment in guiding orifice 2 and discharge port 34 connects directly with passage 32.

Upon reversal of flow of fluid through the pipe-line fluid will re-enter the feeder through dual-service port 17 and duct 18 or in Fig. 2 it will enter through dual-service port 17 directly into the adjacent compartment in guiding orifice 2. Thence it will shift the parts in reverse manner so as to shift piston 8 from the position shown in Fig. 2 to the left. This causes the fluid on the left of the piston to be discharged out of ducts 29 and 31 into discharge passage 32 and thence out of the outlet port. The remaining fluid entering cylindrical piston 5 then passes out thereof through by-pass ducts 35, 16, into passage 10, duct 14, passages 24 and 23, past valve 25 and thence through dual-service port 19.

Thus the injection of fluid under pressure into either one of the dual-service ports 17 or 19 creates a pressure in the associated compartment in the piston guiding orifice 2 which forces the hollow piston 5 toward the opposite end of the body. The closure of the check valve on the end of the piston provides positive operation of the feeder under all conditions of mounting and pressure and the movement of the hollow piston 5 to the opposite end of the orifice 2, brings a corresponding piston discharge port, 28 or 29, into connection with a corresponding port in the walls of the piston guiding orifice, while also bringing one of the piston inlet ports 26 or 27 into connection with a stationary port 12 or 15 connected with the fluid receiving compartment.

Thus the fluid enters one of the opposed chambers of the hollow piston 5 under pressure and forces the snug fitting auxiliary piston 8 toward the opposite chamber expelling therefrom the fluid with which it was charged by the previous operation of the auxiliary piston 8 in the opposite direction. As the auxiliary piston 8 completes its stroke, it uncovers the by-pass outlet port 35 in the side wall of the hollow piston which is connected with port 13 or 16 thence to the other dual-service port. The predetermined quantity of fluid is thus discharged through the outlet port 34 and the fluid thereafter received is freely by-passed to the other dual-service port and the continuation of the line.

It will be understood that in the fluid distributing feeder constructed in accordance with my invention, the passages 9, 10 and 32 function merely as ducts or passages for conducting the fluid. Since these passages do not receive snug fitting pistons or valves sliding therein, it is not necessary to drill and finish them with great accuracy and precision. Hence, in accordance with my invention, passages such as 9, 10 and 32 may be drilled in any rapid convenient manner.

It will be seen that I have provided an improved fluid distributing feeder which is of simple construction and which has positive operating characteristics.

Aside from the specific embodiments of the invention herein shown and described, it will be understood that numerous details of the construction may be altered or omitted without departing from the spirit and scope of the invention as disclosed and claimed, and that I do not desire to limit the invention to the exact constructions herein set forth.

I claim:

1. A fluid distributing feeder comprising a body, a piston receiving guiding orifice in said body, a hollow piston slidably disposed in said orifice, auxiliary piston means slidable in said hollow piston for dividing the same into opposed chambers, closure means for closing opposite ends of said orifice to define two compartments separated by said hollow piston, a dual-service port connected with each of said compartments, discharge means in said body and guiding orifice, discharge ports in said hollow piston for connecting one or the other of its enclosed chambers with said discharge means accordingly as the hollow piston reciprocates in one direction or the other in response to fluid pressure applied in either compartment, and cooperative port means in the hollow piston and its guide for connecting the other chamber in the piston with the compartment receiving the fluid pressure.

2. A fluid distributing feeder comprising, a body, a piston guiding orifice in said body, closure means at opposite ends of said orifice, stationary discharge ports in the side walls of said orifice and spaced adjacent opposite ends thereof an external discharge port, means interconnecting said stationary discharge ports with said external discharge port, a hollow piston closed at opposite ends and slidably disposed in said orifice for movement to either of two extreme positions therein, a pair of discharge ports and a pair of inlet ports in said piston adjacent the closed ends thereof for discharging fluid from the hollow piston to either of said discharge ports corresponding to the position of the piston in said orifice, a pair of by-passing ports spaced axially in a middle portion of the side wall of said orifice, a by-passing channel extending from each of said by-passing ports, an external dual-service port associated with each of said channels, a by-passing port penetrating the side wall of said hollow piston substantially in the middle whereby one or the other of said pair of stationary by-passing ports registers with the piston by-passing port according to the position of the piston in the orifice, and an auxiliary piston slidably disposed in said hollow piston for internally dividing it into opposed chambers connected on one side to the spaced by-passing port which is connected to the dual-service port receiving fluid and a chamber on the other side connected to the piston discharge port which is operatively connected with the associated stationary discharge port, whereby fluid admitted into the hollow piston forces the auxiliary piston to drive fluid out of the other chamber and to then uncover said middle piston by-passing port for by-passing fluid received from said dual-service port.

3. In a lubricating device of the character described the combination of a body having a cylinder therein and having lubricant inlet and outlet passages communicating with said cylinder, a plunger shiftable in said cylinder by lubricant pressure for discharging predetermined quantities of lubricant therefrom, and valve means shiftable in said cylinder by lubricant pressure for cooperation with said passages and said plunger, said valve means having a passage therethrough rendered effective by shifting of the plunger and valve means for by-passing lubricant through the device.

DAVID R. HILLIS.